United States Patent [19]

Kovacs

[11] Patent Number: 4,538,064
[45] Date of Patent: Aug. 27, 1985

[54] DEVICE FOR THE MONITORING OF ICE FORMATION

[76] Inventor: Paul Kovacs, Am Brunnenbächli 2, CH-8125 Zollikerberg, Switzerland

[21] Appl. No.: 441,167

[22] Filed: Nov. 12, 1982

[30] Foreign Application Priority Data

Nov. 13, 1981 [CH] Switzerland .................. 7310/81

[51] Int. Cl.³ .................. G01N 21/17; G01W 1/00; G08B 21/00
[52] U.S. Cl. .................. 250/231 R; 250/573; 340/583
[58] Field of Search .................. 250/231 R, 338, 341, 250/573, 575; 340/583

[56] References Cited

U.S. PATENT DOCUMENTS

| | | | |
|---|---|---|---|
| 3,946,286 | 3/1976 | Kinnunen et al. | 340/583 X |
| 4,274,091 | 6/1981 | Decker | 340/583 |
| 4,379,227 | 4/1983 | Kovacs | 250/231 R |

*Primary Examiner*—Edward P. Westin
*Attorney, Agent, or Firm*—Oblon, Fisher, Spivak, McClelland & Maier

[57] ABSTRACT

The device contains a first light source (21) that emits a continuous light and a second light source (18) that emits intermittent light, a photodiode (19) that responds to the light of both light sources and a transparent plate (14) that is located in the light path between the first light source and the photodiode and the surface of which constitutes a measuring surface for ice formation. As long as the measuring surface does not ice up and the plate remains optimally transparent, the photodiode is pushed into the area of saturation by the light rays of the first light source and the light rays of the second light source have little influence on the photocurrent. If ice forms on the measuring surface the light rays of the first light source are weakened and the photocurrent of the photocell is increasingly modulated by the light rays from the second light source. The modulated photocurrent is used as a quantitative signal for the build-up of the ice layer. As the formation of ice impairs the transparency of the plate, by experience, much more rapidly than a coating with dust, it is possible to distinguish between an accumulation of dirt and ice formation on the plate with the aid of electronic circuit that monitors the time-related decrease of transparency.

8 Claims, 7 Drawing Figures

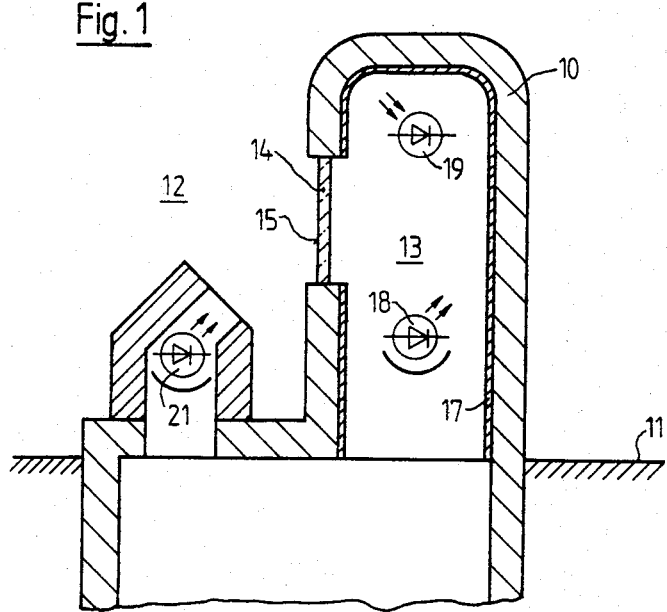
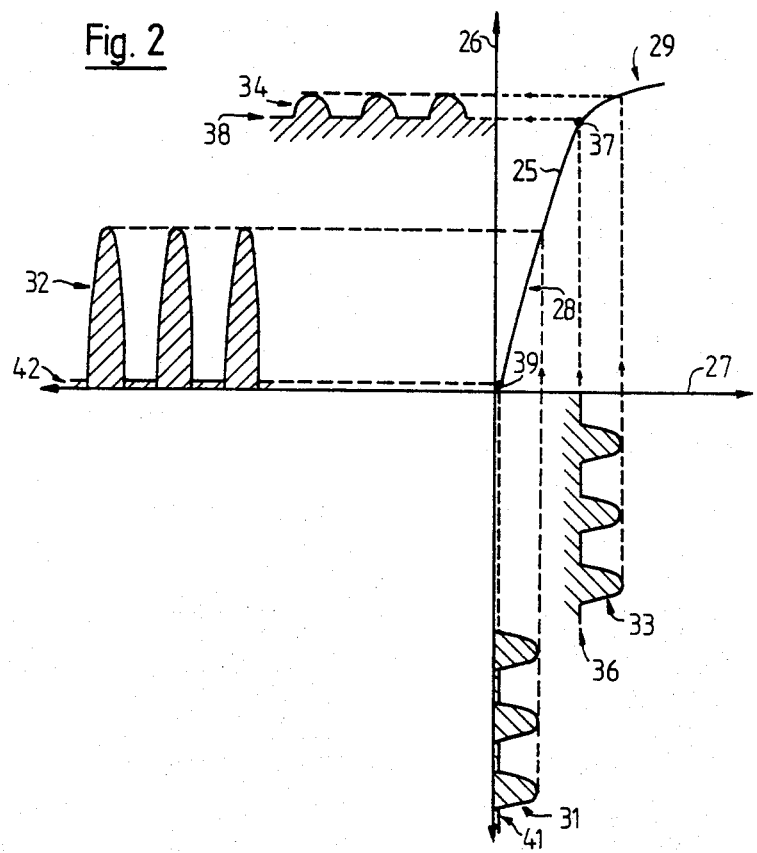

DEVICE FOR THE MONITORING OF ICE FORMATION

BACKGROUND OF THE INVENTION

1. Field of the Invention

The present invention concerns a device for the monitoring of ice formation, using a source of radiation that emits rays continuously, with a radiation sensitive installation that responds to incident rays and produces an electrical output signal and with a transparent element that is placed between the one source of radiation and the radiation sensitive installation and whose transparency changes depending on the condition of its surface.

2. Description of the Prior Art

Undesired formation of ice the surfaces of machines or installations—caused by conditions in the environment or of the operation—can have a negative influence on their operation or even damage them. This is especially true with heat regenerators where the flow canals can be narrowed by ice formation or with aircrafts where the weight can be increased to an intolerable degree by ice formation on the skin or where the rudder could be blocked. Especially endangered are the intakes of axial compressors which take in air of varying humidity and of varying temperature, depending on variations in the atmospheric conditions, and where, in the case of ice formation, the pressure distribution in the subsequent compressor steps could be influenced in an unplanned manner and which could be damaged if ice accumulation would cause an imbalance of the rotor or if ice pieces would separate from the rotating blades and were thrown against other parts of the engine.

For this reason there are already several devices known that monitor the ice formation on surfaces.

A first one of the known devices contains a plug mounted on a support plate that reaches into the area to be monitored or is installed adjoining to that area. With the aid of an electrical device, this plug is made to vibrate. The frequency of these vibrations depends on the degree of cleanliness of the surface of this plug, which means that when it starts to ice up the frequency changes. As soon as the measured change in frequency reaches a certain level, a warning signal is activated. The device has the disadvantage that there is no difference detectable between icing up and the accumulation of dirt, for example dust, which restricts the practical application considerably.

Other known devices work on the principle of a light barrier with a mirror set into the light path between the light source and the light receiver. When humidity condenses or ice forms on the mirror, its reflection capabilities are reduced which causes a corresponding change in the output signal of the light receiver. Because of the optical transparency and the good optical reflection by thin ice layers, the indicator sensitivity is relatively slight, especially during the early stages of ice formation. In addition to this, this installation also cannot distinguish between ice formation and the accumulation of dirt.

SUMMARY OF THE INVENTION

Accordingly, it is an object of the invention to provide a device for the monitoring of ice formation that displays a high sensitivity for the beginning of ice formation and on which the building part used as sensor can preferably also distinguish between ice formation and the build up of dirt.

According to the invention, this task is solved by the use of a device as described at the beginning that is characterized by a second radiation source that emits rays intermittently whereby the light sensitive installation responds to the first and second source of radiation in order to emit either a dominating continuing signal or a strong intermittent signal, depending on the transparency of the transparent element.

The device according to the invention uses the non-linear characteristic curve of the light sensitive installation and, for this reason, makes possible an output signal where the changes, relative to the changes in the incoming light, are greater in the area of a beginning ice formation as in the area of a strong ice formation. For this reason it is possible to recognize the beginning of ice formation in time and with certainty and permits to take counter measures, if necessary, in order to prevent impairment of the operation or damage to the monitored machine.

A preferred model of the device has an electronic monitoring circuitry that makes it possible to distinguish between a change in the output signal of the light receiver caused by ice formation or the accumulation of dirt. This monitoring circuitry can be used for the control of a cleaning installation that is activated when the dirt build up on the transparent element has reached a predetermined value.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designated like or corresponding parts throughout the several views and wherein:

FIG. 1 a schematic representation of the measuring head of the device according to the invention, FIG. 2 the typical characteristic curve of a photodiode, FIG. 3a and 3b two axial sections, turned 90°, of a practically tested model of the measuring head of the device according to the invention, FIG. 4 the principal diagram of an electronic circuit suitable for the operation of a measuring head according to FIG. 3a and 3b and FIG. 5a and 5b the modular display of the circuit logic used in the circuit according to FIG. 4 and logic diagram that belongs to it.

Figure 3A:
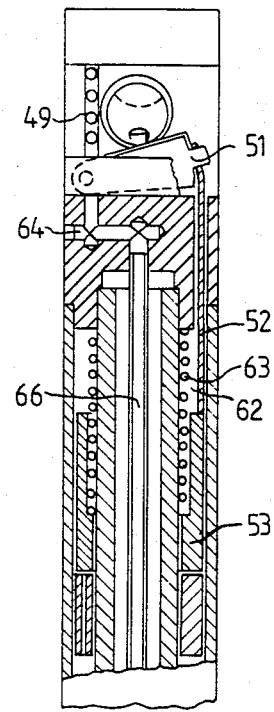

In the figures the same references are used for the same building elements or groups.

DESCRIPTION OF THE PREFERRED EMBODIMENTS

Referring now to FIG. 1, there is shown a measuring head, in a schematic cut, which contains a case 10, closed on all sides, that protrudes into a channel 12 that is laterally defined by an outside wall 11. The case encloses an inside space 13 and has a transparent window 14 the outside surface 15 of which is designed to be the measuring surface. The walls of the inside space are covered by a light absorbing layer 17 and a first radiation source 18 and a light sensitive installation 19 are arranged in such a way inside this interior space that the rays emitted from the radiation source fall in a large part on the light sensitive installation. Furthermore, a second radiation source 21 is installed in such a way outside the inside space that its rays can also fall on the light sensitive installation 19 through the window 14.

The radiation sources 18, 21 used by preference are light emitting light diodes in the infrared area (called LED for short, subsequently) and as light sensitive installation 19 a photodiode that is also sensitive in the infrared area. Such building elements are commercially available and have the advantage for the device described that the emitted or received light, as the case may be, is very little influenced by the surrounding light. The transparent window 14 can—for simplicity's sake—be made from plate glass, but consists by preference of sapphire glass.

FIG. 2 shows the typical course of the characteristic curve 25 of a semiconductor photodiode. The characteristic curve determines the marking current indicated on the Y-axis 26, depending on the light density indicated on the X-axis 27. In the area of small and medium light density, the characteristic curve shows a steeply ascending linear part 28, to which, in the area of high light density, a flattening out part 29—indicating saturation—is joined.

The varied slope of the characteristic curve has the effect that an optical input signal 31 that is in the area of low or medium light density produces a relatively strong electrical output signal, while an optical input signal 33 that is in an area of high light density produces only a relatively weak output signal 34.

The device according to the invention uses this phenomenon to differentiate between a formation of ice on the measuring surface and the build up of dust or dirt. It is for this purpose that—when the measuring head is in operation—the photodiode 19 is illuminated by pulsating light from the first LED 18 and by continuous light from the second LED 21. As the first LED and the photodiode are enclosed into the same interior space 13, the light density on the photo diode that is emitted by the pulsating light is practically not influenced by outside conditions. However, the light of the second LED reaches the photodiode through the window 14 whereby the light density created by the second LED depends on the tranparency of the window or, as the case may be, the coating of its outer surface 15 with a layer of ice or dirt.

When operating this measuring head, the brightness of the second LED is set at a value 36 which, by optimal transparency of the window 14, pushes the working point 37 of the photodiode into the flat part 29 of the characteristic curve. The pulsating light from the first LED 18 then causes a relatively weak pulsating output signal 34 that is superimposed on a relatively strong continuing output signal 38. If the transparency of the window 14 is reduced, and with it also the part of the light density 41 that comes from the second LED, the working point on the characteristic curve is shifted and reaches, for example, point 39 at the lower end of the linear part 28. Then, the output signal of the photodiode only receives a very small continuing portion 42, but an increased pulsating portion 32. If the continuous portion of the output signal of the photodiode is suppressed and only the pulsating portion evaluated, then its non-linear dependency on the total light density causes a change in the output signal that is greater in the area of high light density as in the area of lower light density, which corresponds to a greater sensitivity for a lesser and a lower sensitivity for a stronger coating on the window.

Figure 3B:
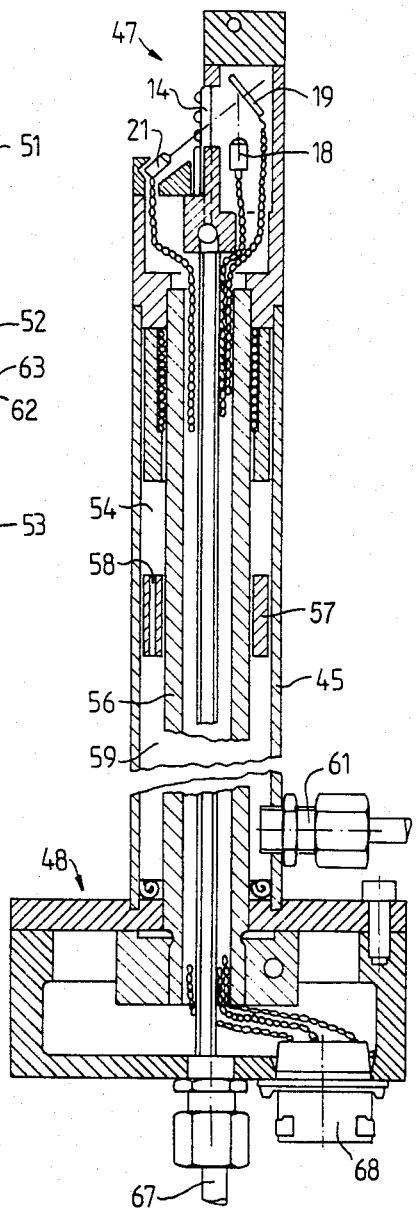

FIGS. 3a and 3b show two axial sections, turned 90°, of an actually tested model of the measuring head according to the invention. This measuring head contains an outside tube 45 to one end of which a head part 47 according to FIG. 1 has been attached, and to the other end a base 48. The head part contains a first and a second LED 18 and 21, a photodiode 19 and, in the light path between the second LED and the photodiode, a transparent window 14.

Furthermore, a cleaning system for the window is planned for this model. This installation consists of several spray nozzles 49, arranged on the side of the window, and a pivoting wiper 51. The wiper is hinged on one end to the head part and—at its free end—connected to a piston rod 52 that is attached to a piston 53 with a ring shaped cross section. The piston can be shifted in a working cylinder 54 that has also a ring shaped cross section. The working cylinder is defined by the inside wall of the outside tube 45, the outside wall of an inside tube 56 that is arranged concentrically in the outside tube, as well as by the head part and a bushing 57 fitted between the two tubes. The bushing has a drill hole 58 parallel to the axis that forms a connecting channel between the working cylinder and an ante chamber 59. A pipe 61 is connected to this ante chamber that leads to a valve and compressed air container that are not shown. The piston has an opening 62 into which a coil spring 63 can be inserted, the free end of which rests against the head part and which, during resting, presses the piston against the bushing, as shown in FIG. 3a.

The spray nozzles 49 are connected—via drill holes 64—to a pipe 66 that is placed inside the inside tube, which, in turn, is connected to a hose 67 that is attached to the base and leads to a container for cleaning solution that is not shown.

The electrical connections for the LED's and the photodiode that are located in the head part, are also led through the inside tube to a cable coupler 68 attached to the base which can be connected to an electronic evaluation circuit through a connecting cable that is not shown.

Figure 4:
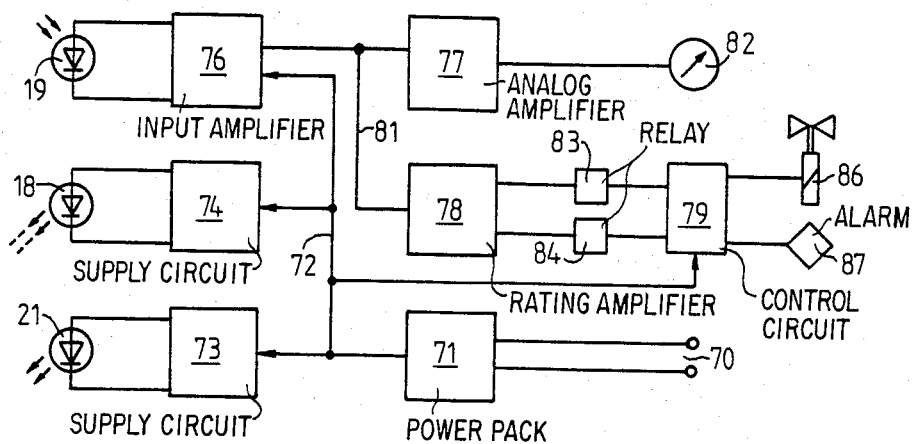

An evaluation circuit suitable for the operation of the described measuring head is shown in FIG. 4. It contains a power pack 71, that can be attached to a supply terminal 70, and to which, through a branch lead 72, feed circuits 73, 74 for the two LED 21 and 18, an input amplifier 76 for the output signal of the photodiode 19, an analog amplifier 77 coupled to the input amplifier and a rating amplifier 78 and a circuitry logic are connected. The output signal of the input amplifier 76 is connected to the entrance to the analog amplifier and the entrance to the rating amplifier via an also branched signal lead 81. The rating amplifier contains two practically equal amplifier channels that are designed to energize two relays of differing responsiveness.

Connected to the exit of the analog amplifier is a magneto-electric instrument 82 and to the two exits of the rating amplifier the field coils of first and second switching relays 83, 84, of which the contacts are connected to the appropriate connections of the circuit 79. The circuit has two exits, one of which is planned for energizing a magnetic valve 86 that operates the washing installation and the other to energize an alarm installation 87.

The power pack, the supply circuit for the second LED, the input amplifier and the analog amplifier for the operations still to be described, can be put together by any expert without further inventive action, and for this reason, no detailed description is given here. The supply circuit 74 for the first LED 18 is designed as an oscillator that energizes the first LED 18 with pulsating direct current with a frequency of 1 kHz, for example. The construction of such an oscillator and the rating amplifier are also within the scope of expert knowledge, and for this reason are not described here in detail.

Figure 5A:
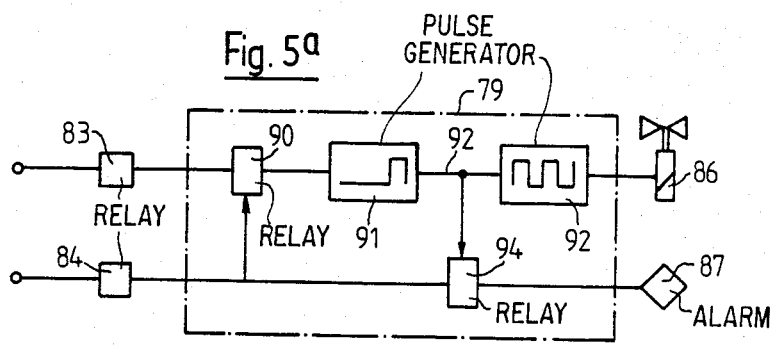

The control circuit 79 is shown in FIG. 5a. The control circuit has two entrances, one of which is connected to the contact circuit of the switch relay 83 and via a third relay 90—the contacts of which are closed in the non-energized state—to the first generator 91. From the exit of this first generator a lead 92 goes to a second generator 93, the exit of which is connected to the magnetic valve 86. The control circuit contains also a fourth relay 94, the contacts of which—when not energized—connect the other entrance, which is connected to the second control relay 84, to the alarm system 87. The energizer winding of the third relay 90 is attached to the entrance that is connected to the second control relay 84 and the energizer winding for the fourth relay to the connecting lead 92 between the two generators. The two generators are designed to generate impulses of several seconds duration and spaced at intervals of up to several minutes from each other, for which reason it is preferred to use so called blink relay where the switching times can be set.

Figure 5B:
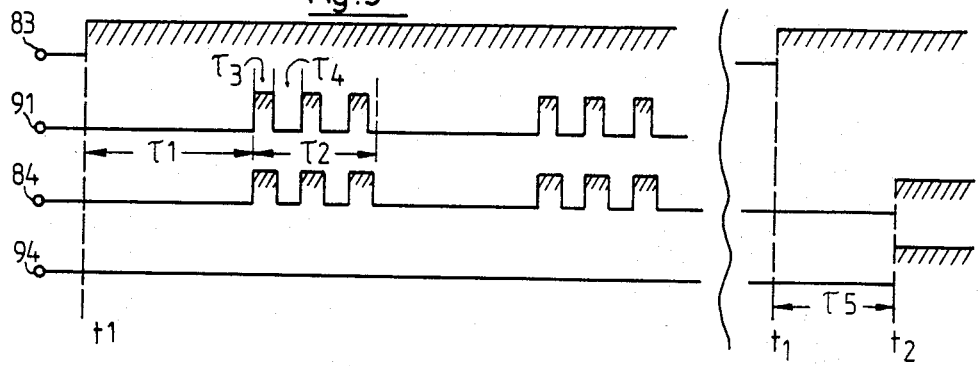

Below, the mode of operation of the measuring head shown in FIG. 3a and 3b and of the evaluation circuit shown in FIG. 4 are described with the aid of the diagram in FIG. 5b. For a clearer representation the width of the individual impulses and their distances from each other as compared to the intervals between the pulse groups are greatly enlarged in this diagram. It is assumed for the description that the operating conditions of the two LED, the photodiode and the amplifiers are set in such a manner that—with optimal transparency of the window in the measuring head—the output signal of the analog and rating amplifiers is about 15% of a maximum output signal with a non-transparent window. It has to be assumed furthermore that one or the other of the switch relays 83 or 84 can be energized when the signal current in the assigned amplifier channel reaches a value that corresponds to a reduction of the transparency of the window by 15% or 45%, whereby the indicator of the magneto-electric instrument shows 30% or 60% respectively of the maximum value. Finally, it is assumed that when activating the first generator 91, the impulse sequence starts with an interval while when activating the second generator 93 the impulse sequence starts with an impulse.

When, at the beginning of the operation, the window of the measuring head is optimally transparent, i.e. its outside surface is neither coated with ice nor dust, the magneto-electric instrument shows—according to the conditions stated above—about 15% of its maximum value and the two switch relays 83, 84 are not energized, for which reason also neither the magnetic valve 86 nor the alarm installation 87 will be activated.

If dust is deposited on the window of the measuring head and its transparency is slowly reduced, then, according to the above assumptions, the switch relay 83 is energized when the indicator on the magneto-electric instrument has reached about 30% of its maximum value. The output signal (FIG. 5b) of the switch relay that is energized at time t1 activates—via the third relay 90 that is closed in the resting position—the first generator 91, the impulse sequence of which starts with an interval $\tau 1$. If, during the time $\tau 1$ of this interval the other switch relay 84—and therefore also the third relay 90—is not energized, then the first impulse of the first generator activates the second generator 92 during the time $\tau 2$. At the same time, this impulse energizes the fourth relay 94 and therefore interrupts the connection from the other switch relay 84 to the alarm installation 87. The second generator then generates an impulse sequence with impulses of the duration $\tau 3$ and intervals of the duration $\tau 4$. These impulses are led to the magnetic valve 86 that is energized during the duration of each impulse and at that time enables the admission of compressed air to the working cylinder 54 and of a cleaning fluid to the nozzles 49. The piston 53 is then pushed by the compressed air into the position shown in FIG. 3b and this shift is transmitted via the piston rod 52 to the wiper 51, so that the wiper executes a wiping movement on the window. At the same time, cleaning fluid is sprayed through the nozzles onto the window. During the intervals between the energizing impulses the magnetic valve is de-energized, whereby the compressed air lead is aired and the piston is pushed back into the position shown in FIG. 3a by the spring 63, which produces a corresponding wiping movement of the wiper across the window. At the same time the spraying of the cleaning fluid is interrupted.

During each wiping movement of the wiper across the window, the light from the LED 21 to the photodiode 19 is interrupted as if the tranparency of the window had dropped to 0. At that time, the magneto-electric instrument shows its maximum value for a short time and the other switch relay 84 is energized. However, the energizing of the other switch relay has no influence on the alarm system, as during the duration of each impulse from the first generator 91 the fourth relay 94 is energized and, by that, the connecting lead from the switch relay 84 to alarm system interrupted.

As soon as the window is cleaned and the transparency has reached a value that is below the assumed marginal value of 30% transparency, the switch relay 83 closes down and the cleaning process has ended. If an ice layer forms on the outside surface of the window, its transparency diminishes relatively rapidly. If the transparency reaches a value of 30% of the maximum value according to the indicator on the electro-magnetic instrument, the switch relay 83 is energized at that time t1, as described above (FIG. 5b, right side). Because, as stated before, the transparency of the window diminishes rapidly during ice formation, the indicator on the magneto-electric instrument reaches 60% of the maximum value at a time t2, whereby the difference $t2-t1=\tau 5$ is smaller then $\tau 1$, i.e. the length of the interval before the first impulse from generator 91. The switch relay 84 that is energized at time t2, energizes then the alarm system 87 through the fourth relay 94, the contacts of which are closed. At the same time, the other switch relay also energizes the third relay 90, the contacts of which are opened and interrupt the activation of the first generator. That ensures that the fourth relay 94 is not energized and therefore the lead to the alarm system is not interrupted.

It is understood that the first structural component of the input amplifier 76 preferably be a RC component that suppresses the direct current component of the output signal from the photodiode 19, so that in the subsequent structural component only pulsating direct current is used. It is also understood that the wiper does not necesserily have to be operated with compressed air, but—depending on the planned use of the installation and the available energy—can also be operated with partial vacuum or an electric motor or an electromagnet. It is also understood that the alarm system can be an optical or an acoustical installation and that the alarm system can be coupled with a safety installation that disconnects the monitored machine in the event of an ice alarm or with a heating system that is activated in the event of an ice alarm. The model of the device shown in FIGS. 3a and 3b was designed for installation into the movement of an axial-flow compressor. As cleaning fluid a mixture of 15% isopropanol and 85% water was used. The first generator generated impulses with a duration of 30 seconds and an interval of about 5 minutes. The second generator generated impulses with a duration and interval of about 5 seconds. Finally, it is also understood that the threshold values stated as examples for the switch relays 83, 84, as well as the above times for the durations of impulses and intervening intervals can be adjusted as desired for an optimal effect of the device.

Obviously, numerous modifications and variations of the present invention are possible in light of the above teachings, it is therefore to be understood that within the scope of the appended claims, the invention may be practiced otherwise than as specifically described herein.

What is claimed as new and desired to be secured by Letters Patent of the United States is:

1. A device for monitoring the formation of ice, comprising:
    a first radiation source for continuously emitting radiation;
    a second radiation source for intermittently emitting radiation;
    light-sensitive means disposed so as to receive said radiation from said first and second radiation sources and capable of producing an electrical output signal in response to said radiation from either radiation source;
    a transparent element disposed between one of said radiation sources and said light-sensitive means, the transparency of said transparent element being changeable depending upon whether said transparent element is clean or is contaminated with a deposit of foreign material; and
    circuitry means responsive to said output signal of said light-sensitive means, said circuitry means providing at least one output for indicating the presence of ice on said transparent element, wherein said output signal of said light-sensitive means varies as a function of said changes in transparency of said transparent element and may be substantially continuous or substantially intermittent depending on the transparency of the transparent element.

2. The device of claim 1, further comprising a case, wherein one of said radiation sources is disposed outside said case, the other radiation source and said light-sensitive means are disposed within said case, and said transparent element is disposed in an opening in a wall of said case.

3. A device according to claim 1 wherein the light sensitive means shows a characteristic curve for the output signal depending on the incident rays with a steep, almost linear part in the area of lesser incident rays and, in the area of stronger incident rays, a flattening part, changing into a saturation curve.

4. The device of claim 1, further comprising an input amplifier and an indicator instrument, wherein said input amplifier is a part of said circuitry means and comprises means for receiving said output signal of said light-sensitive means, suppressing a continuous component of said output signal, and transmitting an intermittent component of said output signal to said indicator instrument.

5. The device of claim 1, wherein said circuitry means comprises a rating amplifier and first and second switch relays, said rating amplifier having an input receiving said output signal of said light-sensitive means and two output channels, said first and second switch relays being driven respectively by said two output channels of said rating amplifier, said first and second switch relays being set to different threshold values of energizing current.

6. The device of claim 5, further comprising washing means for washing said transparent element, said circuitry means further comprising first and second pulse generators, wherein said first switch relay, in an energized condition, activates said first pulse generator, said first pulse generator activates with each pulse said second pulse generator, and said second pulse generator energizes with each pulse said washing means.

7. The device of claim 6, further comprising an alarm installation connected to said output of said circuitry means for indicating the presence of ice on said transparent element, and wherein said circuitry means further comprises third and fourth relays, the contacts of which are closed in a non-energized condition, said third relay being located in said circuitry means between said first switch relay and said first generator, said fourth relay being located in said circuitry means between said second switch relay and said alarm installation, the windings of said third relay being connected to the output of said second switch relay, and the windings of said fourth relay being connected to the output of said first generator.

8. The device of claim 7, wherein said first pulse generator comprises delaying means for delaying the outputting of the pulses from said first pulse generator after activation of said first pulse generator for a time period longer than the time period between the energization of one and the other of said first and second switch relays when said transparent element is icing up.

* * * * *